(12) United States Patent
Darsow et al.

(10) Patent No.: US 8,316,333 B2
(45) Date of Patent: *Nov. 20, 2012

(54) IMPLEMENTING TIMING PESSIMISM REDUCTION FOR PARALLEL CLOCK TREES

(75) Inventors: Craig M. Darsow, Rochester, MN (US); Timothy D. Helvey, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 175 days.

This patent is subject to a terminal disclaimer.

(21) Appl. No.: 12/841,384

(22) Filed: Jul. 22, 2010

(65) Prior Publication Data
US 2012/0023469 A1  Jan. 26, 2012

(51) Int. Cl.
*G06F 17/50* (2006.01)

(52) U.S. Cl. ........ 716/113; 716/108; 716/134; 716/136; 703/13

(58) Field of Classification Search .......... 716/108, 716/113, 134, 136; 703/16
See application file for complete search history.

(56) References Cited

U.S. PATENT DOCUMENTS

| | | | | |
|---|---|---|---|---|
| 5,636,372 A * | 6/1997 | Hathaway et al. | ............ | 713/500 |
| 5,812,835 A * | 9/1998 | Ruuskanen | ............ | 713/503 |
| 6,237,127 B1 * | 5/2001 | Craven et al. | ............ | 716/108 |
| 6,795,951 B2 | 9/2004 | Hathaway et al. | | |
| 7,096,442 B2 * | 8/2006 | Lu et al. | ............ | 716/113 |
| 7,117,466 B2 * | 10/2006 | Kalafala et al. | ............ | 716/108 |
| 7,143,379 B2 | 11/2006 | Darsow et al. | | |
| 7,181,711 B2 | 2/2007 | Foreman et al. | | |
| 7,237,212 B2 * | 6/2007 | Kucukcaker et al. | ......... | 716/113 |
| 7,243,323 B2 * | 7/2007 | Williams et al. | .............. | 716/113 |
| 7,269,812 B2 | 9/2007 | Darsow et al. | | |
| 7,398,491 B2 | 7/2008 | Schaeffer et al. | | |
| 7,406,669 B2 * | 7/2008 | Lindberg | ...................... | 716/108 |
| 7,546,500 B2 | 6/2009 | Kapur et al. | | |
| 7,636,905 B2 | 12/2009 | Darsow et al. | | |
| 7,694,254 B2 | 4/2010 | Gregerson et al. | | |
| 7,765,503 B2 * | 7/2010 | Smith | ........... | 716/113 |
| 7,784,003 B2 * | 8/2010 | Buck et al. | ................... | 716/113 |
| 7,797,601 B2 | 9/2010 | Kapur et al. | | |
| 7,886,247 B2 | 2/2011 | Fatemi et al. | | |
| 7,926,019 B1 * | 4/2011 | Ravi | .............................. | 716/134 |
| 8,060,770 B2 * | 11/2011 | Kuzmin et al. | ............... | 713/401 |
| 8,099,702 B2 * | 1/2012 | Hou et al. | ..................... | 716/131 |
| 8,103,997 B2 | 1/2012 | Sinha et al. | | |
| 8,108,816 B2 | 1/2012 | Foreman et al. | | |
| 8,122,404 B2 | 2/2012 | Sinha et al. | | |
| 8,122,411 B2 | 2/2012 | Abbaspour et al. | | |
| 8,141,014 B2 | 3/2012 | Foreman et al. | | |
| 2005/0066297 A1 | 3/2005 | Kalafala et al. | | |

(Continued)

OTHER PUBLICATIONS

Zejda et al.; "General Framework for Removal of Clock Network Pessimism"; IEEE/ACM International Conference; Year 2002; pp. 632-639.*

(Continued)

*Primary Examiner* — Naum Levin
(74) *Attorney, Agent, or Firm* — Joan Pennington

(57) ABSTRACT

A computer-implemented method, system, and computer program product are provided for implementing timing pessimism reduction for parallel clock trees. A common path tracing algorithm in a static timing tool is enhanced to include a proximity credit used for pairs of gates in two clock trees that are placed in close proximity to each other. The proximity credit given is equal to a predefined fraction of a proximity component of a gate delay.

20 Claims, 5 Drawing Sheets

U.S. PATENT DOCUMENTS

| | | |
|---|---|---|
| 2005/0183051 A1 | 8/2005 | Darsow et al. |
| 2006/0248485 A1 | 11/2006 | Foreman et al. |
| 2007/0022397 A1 | 1/2007 | Darsow et al. |
| 2007/0277131 A1 | 11/2007 | Schaeffer et al. |
| 2008/0163147 A1 | 7/2008 | Gregerson et al. |
| 2008/0209372 A1 | 8/2008 | Buck et al. |
| 2009/0222780 A1 | 9/2009 | Smith |
| 2010/0083205 A1* | 4/2010 | Ono .................................. 716/6 |
| 2010/0269083 A1 | 10/2010 | Sinha et al. |
| 2010/0318951 A1 | 12/2010 | Foreman et al. |
| 2011/0016442 A1 | 1/2011 | Abbaspour et al. |
| 2011/0035714 A1 | 2/2011 | Foreman et al. |
| 2011/0239173 A1 | 9/2011 | Ravi |
| 2012/0023466 A1* | 1/2012 | Darsow et al. ................. 716/108 |
| 2012/0023469 A1 | 1/2012 | Darsow et al. |

OTHER PUBLICATIONS

US patent application, entitled "Implementing Forward Tracing to Reduce Pessimism in Static Timing of Logic Blocks Laid Out in Parallel Structures on an Integrated Circuit Chip," filed Jul. 22, 2010 by Craig M. Darsow et al.

* cited by examiner

IMPLEMENTING TIMING PESSIMISM REDUCTION FOR PARALLEL CLOCK TREES

FIELD OF THE INVENTION

The present invention relates generally to the field of static timing analysis of integrated circuit design, and more particularly, relates to a method, system, and computer program product for implementing timing pessimism reduction for parallel clock trees.

DESCRIPTION OF THE RELATED ART

A static timing tool typically is used to automatically analyze the timing of an integrated circuit design to ensure that circuits meet critical timing constraints. EinsTimer, a commercially available static timing tool by International Business Machines Corporation, of Armonk, N.Y., performs static timing analysis on an integrated circuit design.

In some Application Specific Integrated Circuit (ASIC) designs, clock trees are built such that synchronous clocks have parallel clock trees. This might happen when a divided clock is used. For example, some latches in the design may be clocked at 500 MHz and some at 250 MHz with the 250 MHz clock being created from the 500 MHz using a clock divider at the base of the clock trees.

When using this sort of parallel clock tree structure, logic paths that cross from one of the clock trees to the other clock tree can suffer from significant variation penalties due to the large number of clock gates that are not common between the latches involved. Timing pessimism results when considering delay variation along common segments of clock paths.

If these parallel clock trees are built with similar layouts using gates at each level of the tree that are placed near each other, then it is known that some of the variation penalty can be reduced. This reduction comes from the fact that gates far away from each other on a chip die typically have more process variation than gates that are near each other.

Tools exist, such as EinsTimer, to reduce timing pessimism by taking advantage of this reduction in variation due to proximity. However, these tools require all gates, which are not common between source and sink latch to be inside a bounding box. In conventional topology, individual pairs of gates would fit inside a bounding box, but the complete topology does not fit inside the bounding box.

A need exists for an efficient and effective method to reduce timing pessimism for parallel clock trees.

SUMMARY OF THE INVENTION

Principal aspects of the present invention are to provide a method, system, and computer program product for implementing timing pessimism reduction for parallel clock trees. Other important aspects of the present invention are to provide such method, system, and computer program product substantially without negative effect and that overcome some of the disadvantages of prior art arrangements.

In brief, a computer-implemented method, system, and computer program product are provided for implementing timing pessimism reduction for parallel clock trees. A common path tracing algorithm in a static timing tool is enhanced by a parallel path proximity credit algorithm to include a proximity credit used for pairs of gates in two clock trees that are placed in close proximity to each other. The proximity credit given is equal to a predefined fraction of a proximity component of a gate delay.

In accordance with features of the invention, the parallel path proximity credit algorithm begins by tracing back from clock and data test points to a clock starting point. After finding the clock starting point, the parallel path proximity credit algorithm traces forward for both paths to find the point where the paths diverge. The parallel path proximity credit algorithm then traces forward to the next gate in each path. If the gates are not in close proximity, the algorithm ends. If these gates are in close proximity, then the proximity credit is given. The proximity check then moves on to the next pair of gates in the path and repeats if they are in close proximity to each other.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method is provided for implementing timing pessimism reduction for parallel clock trees. A parallel path proximity credit algorithm is provided to enhance a common path pessimism removal algorithm using a proximity credit for proximately placed pairs of gates in two clock trees.

Figure 1:
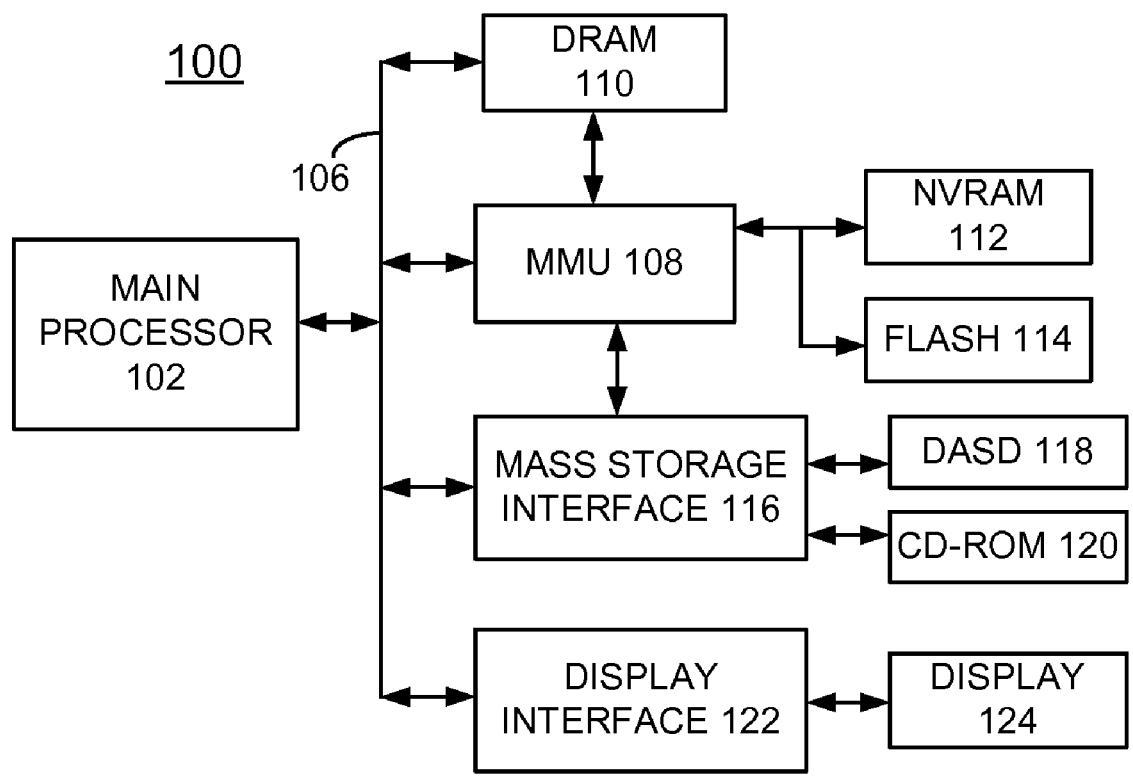
FIGS. 1 and 2 are block diagram representations illustrating an example computer system and operating system for implementing timing pessimism reduction for parallel clock trees in accordance with the preferred embodiment.
Figure 2:
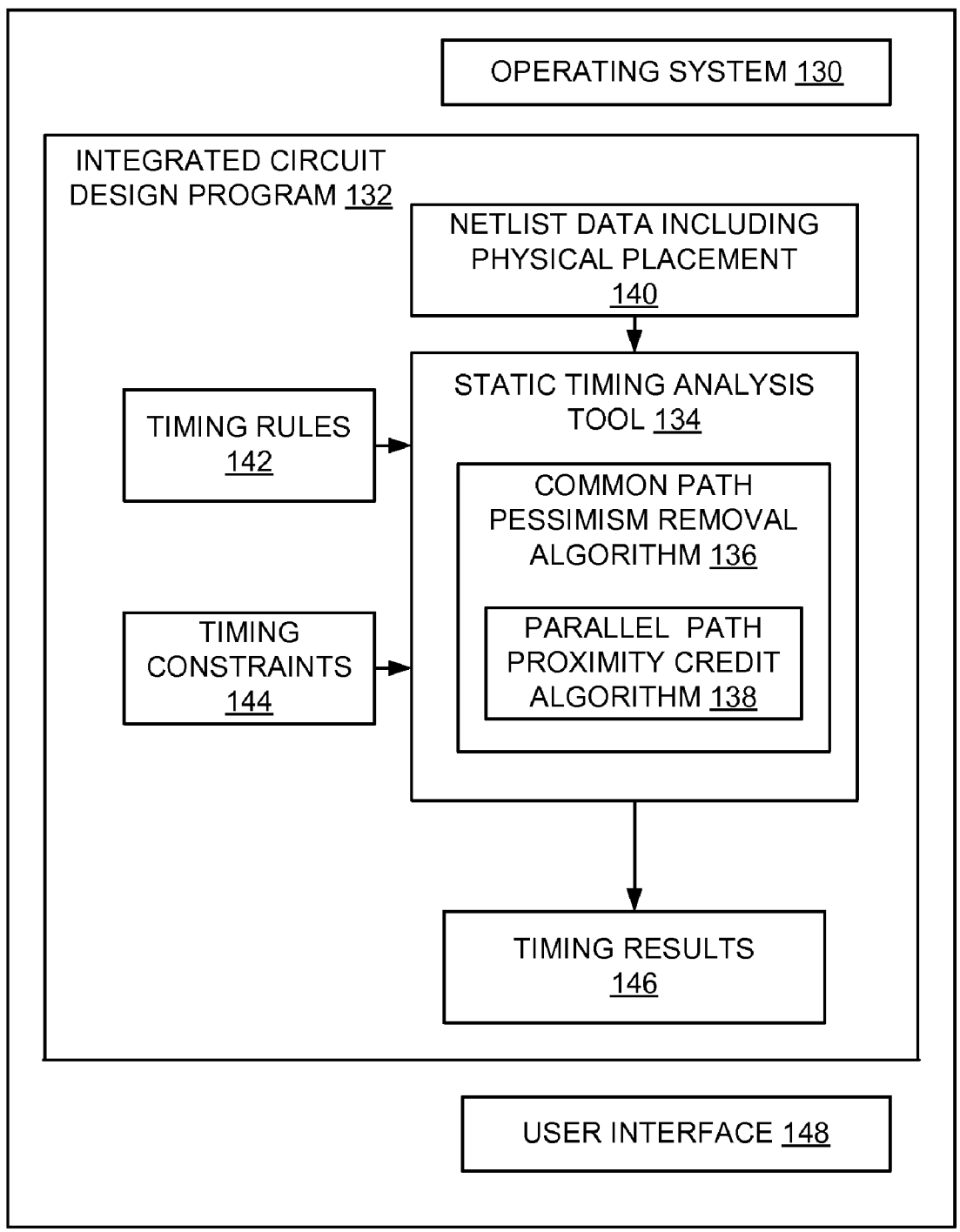

Referring now to the drawings, in FIGS. 1 and 2 there is shown a computer system generally designated by the reference character 100 for implementing timing pessimism reduction for parallel clock trees in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 coupled to the system bus 106 and connected to a display 124.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

As shown in FIG. 2, computer system 100 includes an operating system 130, an integrated circuit design program 132, a static timing analysis tool 134, a common path pessimism removal algorithm or program 136, a parallel path proximity credit algorithm or program 138 of the preferred embodiment, timing rules 142, timing constraints 144, timing results 146, and a user interface 148.

Various commercially available computers can be used for computer system 100. CPU 102 is suitably programmed by the parallel path proximity credit algorithm or program 138 to execute the flowchart of FIG. 4 for implementing methods for timing pessimism reduction for parallel clock trees in accordance with the preferred embodiment.

Figure 3:
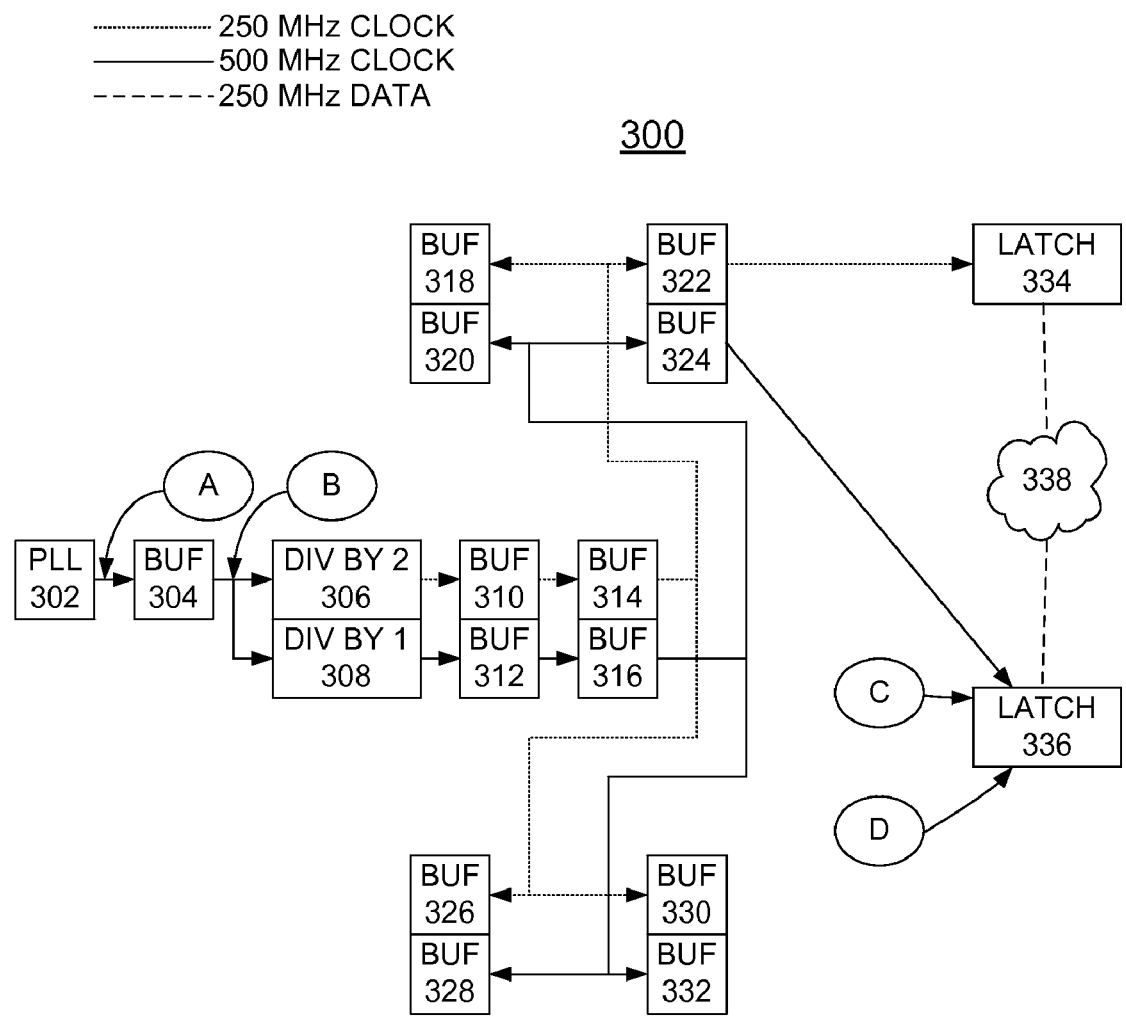
FIG. 3 is an example integrated circuit of a type to be used for implementing timing pessimism reduction for parallel clock trees in accordance with the preferred embodiment.

Referring to FIG. 3, an example integrated circuit of a type to be used for implementing timing pessimism reduction for parallel clock trees generally designated by the reference character 300 in accordance with the preferred embodiment. The integrated circuit 300 includes a Phase Locked Loop (PLL) 302 generating a clock, such as a 500 MHz clock, that is applied to a buffer (BUF) 304. A pair of dividers 306, 308, such as a divide by 2, and a divide by 1, receives the 500 MHz clock at an output of the buffer 304. The divide by 2 divider 306 provides an output 250 MHz clock indicated by dotted line and the divide by 1 divider 308 provides an output 500 MHz clock indicated by solid line, respectively applied to a first buffer 310, and a first buffer 312 and a second buffer 314, and a second buffer 316. Parallel 250 MHz and 500 MHz clock trees extend between respective pairs of buffers 318, and 320; 322, and 324, 326, and 328; and 330, and 332, and are applied to a pair of latches 334, 336 providing data indicated by a dashed line connected by data circuitry 338.

Having reference to FIG. 3, the parallel path proximity credit algorithm or program 138 of the invention is applied to the common path tracing algorithm 136 included in the static timing tool 134, such as an EinsTimer static timing tool. The parallel path proximity credit algorithm 138 begins by tracing back from the data and clock test points C and D in FIG. 3 to find the starting point for the paths, which is in this case point A in FIG. 3. After finding the starting point A at the output of PLL 302, the parallel path proximity credit algorithm 138 traces forward both paths to find the point where they diverge, which is in this case point B in FIG. 3. The parallel path proximity credit algorithm 138 then traces forward to the next gate in each path, which is a pair of buffers 310, 312 in the example. If the gates are not in close proximity, the parallel path proximity credit algorithm 138 ends. If these gates are in close proximity, then a credit is given equal to some fraction of a proximity component of the gate delay. The proximity component of the gate delay is the portion of the gate delay that could vary if the gates are not near each other. The proximity check then moves on to the next pair of gates 314, 316 in the path and repeats if the gates are in close proximity or are close to each other.

Figure 4:
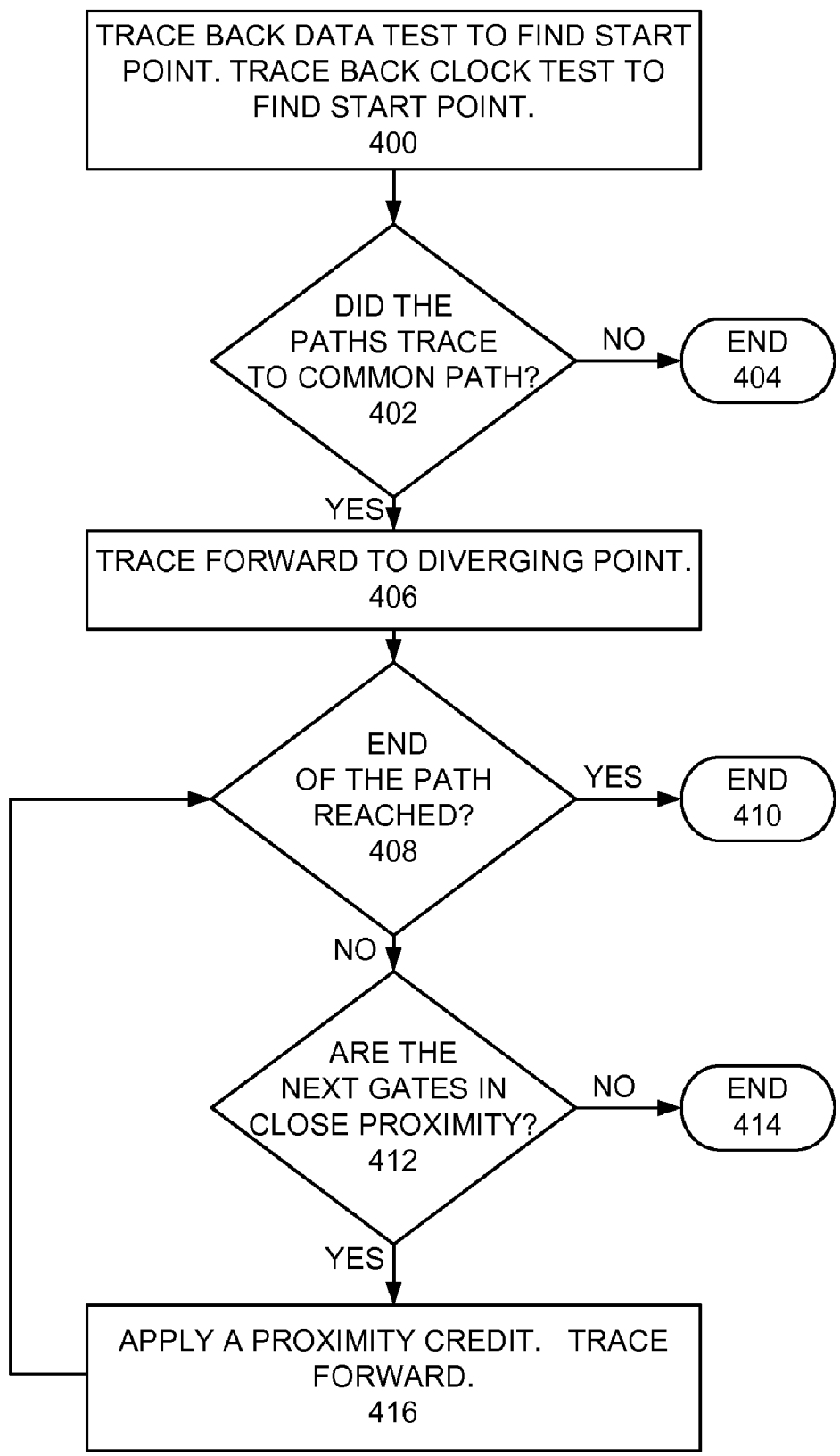
FIG. 4 is a flow chart illustrating exemplary sequential steps for implementing timing pessimism reduction for parallel clock trees in accordance with the preferred embodiment.

Referring now to FIG. 4, there are shown exemplary steps for implementing timing pessimism reduction for parallel clock trees in accordance with the preferred embodiment. As indicated at a block 400, the parallel path proximity credit algorithm 138 begins by tracing back from the clock test and data test to find start points. As indicated at a decision block 402, checking is performed to determine if the paths trace to a common path. If determined that the paths do not trace to a common path, then the parallel path proximity credit algorithm 138 ends as indicated at a block 404.

If determined that the paths trace to a common path, then the parallel path proximity credit algorithm 138 traces forward to a diverging point as indicated at a block 406. As indicated at a decision block 408, checking is performed to determine if the end of the path is reached. If the end of the path is reached, then the parallel path proximity credit algorithm 138 ends as indicated at a block 410.

If the end of the path is not reached, then checking is performed to determine if the next gates are in close proximity as indicated at a decision block 412. If the next gates are not in close proximity, then the parallel path proximity credit algorithm 138 ends as indicated at a block 414. Otherwise when the next gates are in close proximity, then a proximity credit is applied, and the parallel path proximity credit algorithm 138 traces forward as indicated at a block 416. Then the operations return to decision block 408, and are repeated as described above.

Figure 5:
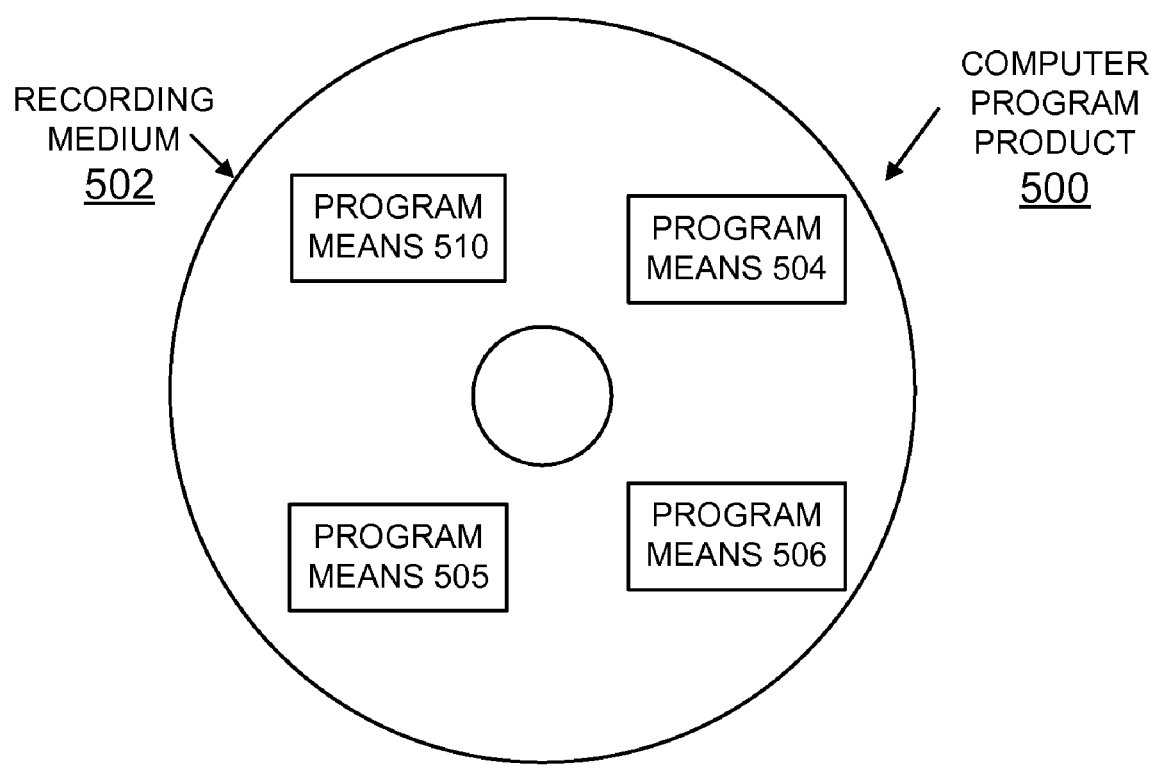
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, or another similar computer program product. Recording medium 502 stores program means 504, 506, 508, 510 on the medium 502 for carrying out the methods for implementing timing pessimism reduction for parallel clock trees of the preferred embodiment in the system 100 of FIGS. 1 and 2.

A sequence of program instructions or a logical assembly of one or more interrelated modules defined by the recorded program means 504, 506, 508, 510, direct the computer system 100 for implementing timing pessimism reduction for parallel clock trees of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing timing pessimism reduction for parallel clock trees in an integrated circuit design in a computer system including a processor, said computer-implemented method comprising:
   using said processor for:
   performing a parallel path proximity credit algorithm, using a common path tracing algorithm in a static timing tool;
   applying a proximity credit, responsive to identifying a pair of gates in the parallel clock trees placed in close proximity to each other, and
   responsive to applying said proximity credit, reducing the timing pessimism for the parallel clock trees in the integrated circuit design.

2. The computer-implemented method as recited in claim 1 wherein using a common path tracing algorithm in a static timing tool, performing a parallel path proximity credit algorithm includes tracking back from clock and data test points to identify a starting point for said paths.

3. The computer-implemented method as recited in claim 2 includes checking for a common path, and responsive to identifying said common path, tracing forward for both paths to identify a diverging point of said paths.

4. The computer-implemented method as recited in claim 3 includes responsive to tracing forward, identifying a next pair of gates in each path, checking for close proximity of said identified next pair of gates.

5. The computer-implemented method as recited in claim 4 includes ending said parallel path proximity credit algorithm responsive to said identified next pair of gates not being in close proximity.

6. The computer-implemented method as recited in claim 4 includes responsive to said identified next pair of gates being in close proximity, applying said proximity credit, tracing forward, identifying a next pair of gates in each path, and checking for close proximity of said identified next pair of gates.

7. A system for implementing timing pessimism reduction for parallel clock trees in an integrated circuit design process comprising:
   a processor,
   a static timing tool tangibly embodied in a non-transitory machine readable storage device used in the integrated circuit design process, said static timing tool including a common path tracing algorithm, and a parallel path proximity credit algorithm,
   said processor, using said common path tracing algorithm in said static timing tool,
   said processor, executing said parallel path proximity credit algorithm, and
   said processor, applying a proximity credit, responsive to identifying a pair of gates in the parallel clock trees placed in close proximity to each other, and
   said processor, responsive to applying said proximity credit, reducing the timing pessimism for the parallel clock trees in the integrated circuit design.

8. The system as recited in claim 7 wherein said processor using said common path tracing algorithm in said static timing tool, executing said parallel path proximity credit algorithm includes receiving netlist data, said netlist data including physical placement data of integrated circuits.

9. The system as recited in claim 7 wherein said processor using said common path tracing algorithm in said static timing tool, executing said parallel path proximity credit algorithm includes said processor tracking back from clock and data test points to identify a starting point for said paths.

10. The system as recited in claim 9 includes said processor checking for a common path, and responsive to identifying said common path, tracing forward for both paths to identify a diverging point of said paths.

11. The system as recited in claim 10 includes said processor responsive to tracing forward, identifying a next pair of gates in each path, checking for close proximity of said identified next pair of gates.

12. The system as recited in claim 11 includes said processor ending said parallel path proximity credit algorithm responsive to said identified next pair of gates not being in close proximity.

13. The system as recited in claim 11 includes said processor responsive to said identified next pair of gates being in close proximity, applying said proximity credit, tracing forward, identifying a next pair of gates in each path, and checking for close proximity of said identified next pair of gates.

14. A computer program product for implementing timing pessimism reduction for parallel clock trees in an integrated circuit design in a computer system, said computer program product tangibly embodied in a non-transitory machine readable storage device used in the integrated circuit design process, said static timing tool including a common path tracing algorithm, and a parallel path proximity credit algorithm, said computer program product including instructions executed by the computer system to cause the computer system to perform the steps of:
   using said common path tracing algorithm in a static timing tool, performing said parallel path proximity credit algorithm,
   applying a proximity credit, responsive to identifying a pair of gates in the parallel clock trees placed in close proximity to each other, and
   responsive to applying said proximity credit, reducing the timing pessimism for the parallel clock trees in the integrated circuit design.

15. The computer program product as recited in claim 14 wherein using said common path tracing algorithm in a static timing tool, performing said parallel path proximity credit algorithm includes receiving netlist data, said netlist data including physical placement data of integrated circuits, receiving timing rules, and receiving timing constraints.

16. The computer program product as recited in claim 14 wherein using said common path tracing algorithm in a static timing tool, performing said parallel path proximity credit algorithm includes tracking back from clock and data test points to identify a starting point for said paths.

17. The computer program product as recited in claim 16 includes checking for a common path, and responsive to identifying said common path, tracing forward for both paths to identify a diverging point of said paths.

18. The computer program product as recited in claim 17 includes responsive to tracing forward, identifying a next pair of gates in each path, checking for close proximity of said identified next pair of gates.

19. The computer program product as recited in claim 18 includes ending said parallel path proximity credit algorithm responsive to said identified next pair of gates not being in close proximity.

20. The computer program product as recited in claim 18 includes responsive to said identified next pair of gates being in close proximity, applying said proximity credit, tracing forward, identifying a next pair of gates in each path, and checking for close proximity of said identified next pair of gates.

* * * * *